United States Patent
Chen et al.

(10) Patent No.: US 8,559,500 B2
(45) Date of Patent: Oct. 15, 2013

(54) LOW-COMPLEXITY INVERSE TRANSFORM AND SUB-SAMPLING

(75) Inventors: Oscal Tzyh-Chiang Chen, Chia-Yi (TW); Chih-Feng Tseng, Chia-Yi (TW); Meng-Lin Hsia, Chia-Yi (TW)

(73) Assignee: National Chung Cheng University, Chia-Yi (TW)

( * ) Notice: Subject to any disclaimer, the term of this patent is extended or adjusted under 35 U.S.C. 154(b) by 545 days.

(21) Appl. No.: 12/688,076

(22) Filed: Jan. 15, 2010

(65) Prior Publication Data

US 2011/0058603 A1     Mar. 10, 2011

(30) Foreign Application Priority Data

Sep. 4, 2009   (TW) ................... 98129967 A

(51) Int. Cl.
- H04N 7/12 (2006.01)
- H04N 11/02 (2006.01)
- H04N 11/04 (2006.01)
- G06K 9/36 (2006.01)
- G06K 9/46 (2006.01)

(52) U.S. Cl.
USPC ............ 375/240.01; 375/240.05; 382/233

(58) Field of Classification Search
USPC .................................... 375/240.01
See application file for complete search history.

(56) References Cited

U.S. PATENT DOCUMENTS

| | | | | |
|---|---|---|---|---|
| 5,614,952 | A * | 3/1997 | Boyce et al. | 375/240.01 |
| 6,456,663 | B1 * | 9/2002 | Kim | 375/240.25 |
| 7,366,236 | B1 | 4/2008 | Winger | |
| 2004/0126021 | A1 * | 7/2004 | Sull et al. | 382/233 |

OTHER PUBLICATIONS

J. Bao, H. Sun & T. C. Poon, "HDTV down-conversion decoder," IEEE Trans. on Consumer Electronics, vol. 42, No. 3, pp. 402-410, Aug. 1996.
H.Sun, "Hierarchical decoder for MPEG compressed video data," IEEE Trans. on Consumer Electronics, vol. 39, No. 3, pp. 559-564, Aug. 1993.
W. Zhu, et al., "A fast and memory efficient algorithm for down-conversion of an HDTV . . . ," IEEE Transactions on Consumer Electronics, vol. 45, No. 1, pp. 57-61, Feb. 1999.
R. Dugad, et al., "A fast scheme for downsampling and upsampling in the DCT . . . ," IEEE Trans. on Circuit and systems for Video Technology, vol. 11, No. 4, pp. 461-474, Apr. 2001.
Shu Shi, et al., "A low complexity MPEG video decoder with arbitrary . . . ," Proc. of IEEE Workshop on Embedded Systems for Real Time Multimedia, vol. 2, pp. 13-18, Oct. 2006.

* cited by examiner

*Primary Examiner* — Chikaodili E Anyikire
*Assistant Examiner* — Hee-Yong Kim
(74) *Attorney, Agent, or Firm* — Ming Chow; Sinorica, LLC

(57) ABSTRACT

Disclosed is a method of inverse transform and sub-sampling having low computational complexity, wherein, a complicated inverse transform process is simplified, meanwhile, a sub-sampling is performed, in particular said simplified process is provided with a compensation scheme, and that is utilized to solve a distortion problem as incurred by said simplified process. This method can be utilized in a video or image codec, for an inverse transform and a sub-sampling from a frequency domain to a spatial domain, thus reducing computational complexity of a frame-size reduction transform, and increasing decoding speed. Said method is applicable in equal and unequal reduction ratios of a frame length and width.

6 Claims, 5 Drawing Sheets

LOW-COMPLEXITY INVERSE TRANSFORM AND SUB-SAMPLING

BACKGROUND OF THE INVENTION

1. Field of the Invention

The present invention relates to an inverse transform and sub-sampling method, that is capable of simplifying a complicated inverse transform process, while performing sub-sampling simultaneously; and in particular to a low-complexity method applied to video decompression and frame-size reduction, that is used to simplify a process of transforming inversely frequency-domain coefficients to time-domain data and downsizing these inversely-transformed data by using a coefficient compensation technique, so as to overcome the distortion problem as caused by the simplified process.

2. The Prior Arts

In general, the compression of multimedia data is achieved by means of transform from a spatial domain to a frequency domain, quantization and variable-length coding. The transforms between a spatial domain and a frequency domain commonly utilized are as follows: a discrete wavelet transform, a discrete sine transform, a Discrete Cosine Transform (DCT), or a discrete Fourier transform, etc. Usually, for videos or images, DCT or discrete wavelet transform is adopted and conducted based on a block. Transformations are performed on blocks of videos or images, such that after transform, each transformed block has the information concentrated at its low frequency part, so as to facilitate the subsequent quantization and variable-length encoding. The transform between a spatial domain and a frequency domain usually requires enormous amount of computations at both the encoding and decoding processes. In a decoding process where the decoding speed is essential, the inverse transform process from a frequency domain to a spatial domain will create burden on the decoder. Therefore, a lot of researches have been conducted on this subject with their emphases on the computational manner of the inverse transform. In this respect, various fast inverse transform computations have been proposed, such as, U.S. Pat. No. 5,452,466 (reference document 1), U.S. Pat. No. 5,590,066 (Reference document 2) and U.S. Pat. No. 5,596,517 (reference document 3).

In addition, in certain documents and inventions considering the frequency-domain coefficient distributions, various methods have been proposed to reduce computational complexity in a decoder associated with an inverse transform from a frequency domain to a spatial domain. Through a transform from a spatial domain to a frequency domain, the energy of the transformed coefficients will concentrate on its low frequency portion. Owing to this characteristic, U.S. Pat. No. 5,883,823 (reference document 4) proposed a simplified Inverse Discrete Cosine Transform (IDCT) process at an 8×8-point block, wherein, the IDCT is performed only for 16 low frequency coefficients in the upper left corner of the frequency-domain coefficients and the non-zero coefficients of the remaining 48 coefficients, thus reducing the computational complexity of the IDCT.

In U.S. Pat. No. 6,717,988 (reference document 5), a device is utilized to determine the non-zero coefficient distribution in the frequency-domain coefficients received by a decoder. The larger is the spreading range of the non-zero coefficients in a block, the more complex is the computation in performing an IDCT. Therefore, the computation of IDCT of a decoder can be adjusted due to the result of determination obtained in advance; thus the inverse transform is performed only for coefficients in a specific range, so as to filter out the inverse transform operations associated with coefficients out of this pre-determined range. However, compared with the method of U.S. Pat. No. 5,883,823 (reference document 4), in this patent invention, some of the information associated with non-zero high-frequency coefficients will be lost.

In U.S. Pat. No. 7,142,598 (reference document 6), frame energy is used to determine the process flow of an IDCT, and the frame energy is defined as the mean of the summation of difference between the value of each pixel and the average value of all the pixels in an entire frame; in addition, a block energy is defined as the mean of the summation of difference between value of each pixel in a block and the average value of all the pixels in an entire block. As such, before performing an IDCT for each of the blocks, block energy and frame energy are compared. In case that the block energy is larger than the frame energy, then IDCT for the 16 low-frequency coefficients in the upper left corner of a block is conducted; in case that the block energy is positive and is less than the frame energy, then IDCT for the 9 low-frequency coefficients in the upper left corner of the block is performed, and in case that the block energy is negative and is less than the frame energy, then IDCT for 1 low-frequency coefficient in the upper left corner of the block is computed. In this method, likewise, the information associated with high-frequency coefficients tends to be lost.

In U.S. Pat. No. 7,366,236 (reference document 7), the End-Of-Block (EOB) position (the position of the last non-zero coefficient in a block using a zig-zag scan) is used to understand the coefficient distribution in a block, and an IDCT is only performed for a portion of the coefficients. Wherein, when the EOB point is equal to zero, perform IDCT only for the Direct Current (DC) coefficient; when the EOB point is not equal to zero, and only one of the 64 coefficients is not equal to zero, perform table-lookup and IDCT for the non-zero coefficient; when the EOB point is less than or equal to 14, perform IDCT for the 20 low-frequency coefficients in the upper left corner of the block; when the EOB point is less than or equal to 25, perform IDCT only for the 42 low-frequency coefficients in the upper left corner of the block; and when the EOB point is a number other than those mentioned above, perform IDCT for all 64 coefficients in the block. Through the application of this method, no high-frequency information or low-frequency information will be lost.

In U.S. Pat. No. 7,129,962 (reference document 8), the operation process of IDCT is not implemented through the computation of matrices; it is rather achieved in the following manner: to each spatial-domain datum, all non-zero frequency-domain coefficients are utilized to look up a coefficient table, then additions and multiplications are performed to re-establish each of the spatial-domain data; while the coefficient table is composed of numeric values which are used to multiply the non-zero frequency-domain coefficients while performing IDCT. As such, every eight spatial-domain data are adopted as a unit for parallel processing in expediting the operation speed. Moreover, the operation process associated with the frequency-domain coefficients of zero can be deducted. To compare the reference documents 4 to 8, Table 1 is prepared in the following based on the frequency-domain coefficient distributions used for the simplified inverse transform processes.

TABLE 1

Characteristics of inverse transforms from a frequency domain to a spatial domain for reference documents 4-8.

| Ref. Doc. | Implementation means | Characteristics (advantages & shortcomings) |
|---|---|---|
| [4] | Performing the inverse transform from a frequency domain to a spatial domain only for 16 low-frequency coefficients and non-zero high-frequency coefficients in the frequency domain. | Conserving computation amount of the inverse transform while keeping all the transformation information; yet may need additional computation amount in determining coefficient value. |
| [5] | Determining the manners of the inverse transform from a frequency domain to a spatial domain based on the coefficient distribution in the frequency domain. | May lose a portion of non-zero coefficients during the inverse transform process, and result in losing part of information. |
| [6] | Determining whether to perform a complete inverse transform process based on block energy. | Reducing computational complexity of the inverse transform, yet the simplified process may result in losing information. |
| [7] | Determining the manners of the inverse transform based on the EOB point. | Saving part of computation time, yet still performing the inverse transform for lots of zero coefficients, increasing computation amount of the inverse transform. |
| [8] | Completing the inverse transform process in parallel processing. | Keeping complete transformation information, shortening computation time of the inverse transform, yet reduction of computation amount being not enough. |

Due to the displaying requirement, the video or image decoder usually is accompanied with a frame-size reduction and enlargement function, that requires very complicated computation process, so as to figure out data of the reduced or enlarged frame. Therefore, quite a lot of researches have been conducted in this field, with their emphases on reducing computational complexity of a frame size conversion. In this respect, a video codec is taken as an example for explanation. In a video encoder, a DCT is usually utilized to transform spatial-domain data into frequency-domain data, subsequently, through the processing of quantization and variable-length encoding, thus achieving the efficacy of data compression. In a video decoder, usually, the data before being implemented by an IDCT are referred to as frequency-domain coefficients, and the data after being implemented by an IDCT are referred to as spatial-domain data. The frame size conversion can be classified into two categories depending on the data type to be processed: in case that the frame size conversion is arranged before an IDCT, then the data processed are frequency-domain coefficients, and this conversion is referred to as a frequency-domain frame-size conversion; and in case that the frame size conversion is arranged after an IDCT, then this conversion is referred to as a spatial-domain frame-size conversion. Moreover, in the process of video decoding, when the frame size is reduced, the capacity of the reference frame memory used by motion compensation can be adjusted according to the reduced frame size, so as to achieve the objective of reducing the memory size required.

The spatial-domain frame-size reduction approach is used to sub-sample spatial-domain data after the inverse transform, and the frequency-domain frame-size reduction approach is employed to sub-sample frequency-domain coefficients before the inverse transform. Therefore, the frequency-domain frame-size reduction approach can be adopted to reduce the amount of data processed by IDCT, hereby reducing the overall computation of a decoder.

In addition, refer to reference document 9 (Huifang Sun, "Hierarchical decoder for MPEG compressed video data" IEEE Transactions on Consumer Electronics, vol. 39, no. 3, pp. 559-564, August 1993) for a frequency-domain frame-size reduction method. As illustrated in this method, the basic unit of frame reduction includes 64 frequency-domain coefficients in a block, and the 16 low-frequency coefficients in the upper left corner of its block are preserved, and they are performed by an inverse transform from a frequency domain to a spatial domain, thus obtaining spatial-domain data with a size of 4×4. When the spatial-domain data are transformed into the frequency-domain coefficients, the energy of data in a block will be concentrated on the low-frequency portion in the upper left corner of a block. Therefore, in performing a frame-size reduction, the low-frequency coefficients are preserved for proceeding with the inverse transform from a frequency domain to a spatial domain, thus being able to preserve most of the information associated with the original spatial-domain data. However, other frequency-domain coefficients located at the high-frequency portion of a block may not be zero at all. Therefore, in performing this method of preserving low-frequency coefficients, part of high-frequency information may be lost.

In view of the shortcomings and drawbacks of the prior art, the present invention proposes a method of inverse transform and sub-sampling having low computational complexity, so as to improve the shortcomings of the prior art.

SUMMARY OF THE INVENTION

A major objective of the present invention is to provide a method of inverse transform and sub-sampling having low computational complexity. Wherein, a sub-sampling is integrated with an inverse transform from a frequency domain to a spatial domain where all the frequency-domain non-zero coefficients are processed to preserve the integrity of information. In addition, the integrated process is simplified, thus reducing the computational complexity of inverse transform and sub-sampling. Particularly, a compensation scheme is additionally provided and executed in the simplified process, hereby solving the problem of distortion as incurred by the simplified process.

Another objective of the present invention is to provide a method of inverse transform and sub-sampling, that is used to provide an integrated process to reduce its enormously large computational complexity, and that can be utilized in a video decoder with a frame-size reduction. Since it performs a frame-size reduction on frequency-domain coefficients, therefore it is able to achieve the objective of reducing the reference memory size required.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The related drawings in connection with the detailed description of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed description with reference to the attached drawings.

Presently, quite a lot of video decoders are provided with a frame-size scaling, that is used to implement the frame size conversion for the decoded frame by utilizing adjacent pixels in generating new pixels, such as pixel-value interpolation, thus achieving the objective of frame-size reduction by reducing the number of pixels in a frame. Since in performing interpolation of pixel values, the information of an entire frame is effectively utilized, therefore, the difference between the interpolated pixel values and the original data can be minimized. However, the computation required by such frame-size scaling is enormously complex; therefore, the researches of the prior art proposed to put the process of frame-size reduction before the inverse transform in a decoding process. Due to the downscaling, the number of data required to be processed by an inverse transform is reduced, thus effectively reducing the computational complexity of frame size reduction.

The present invention proposes a method of inverse transform and sub-sampling that can be applied to a video or image decoder with a frame-size reduction, in simplifying the computation process of inverse transform and sub-sampling from a frequency domain to a spatial domain, hereby facilitating real-time decoding and displaying. In addition, in the present invention, the video decoding and downscaling are taken as an example for explanation, for which, in a video decoder, the inverse transform (namely, IDCT) and sub-sampling (namely, frame-size reduction) are integrated, then the integrated process flow is simplified according to the reduction ratio of a frame size. Finally, a scheme of frequency-domain compensation is adopted and executed to eliminate the distortion incurred in the simplified process.

Figure 1:
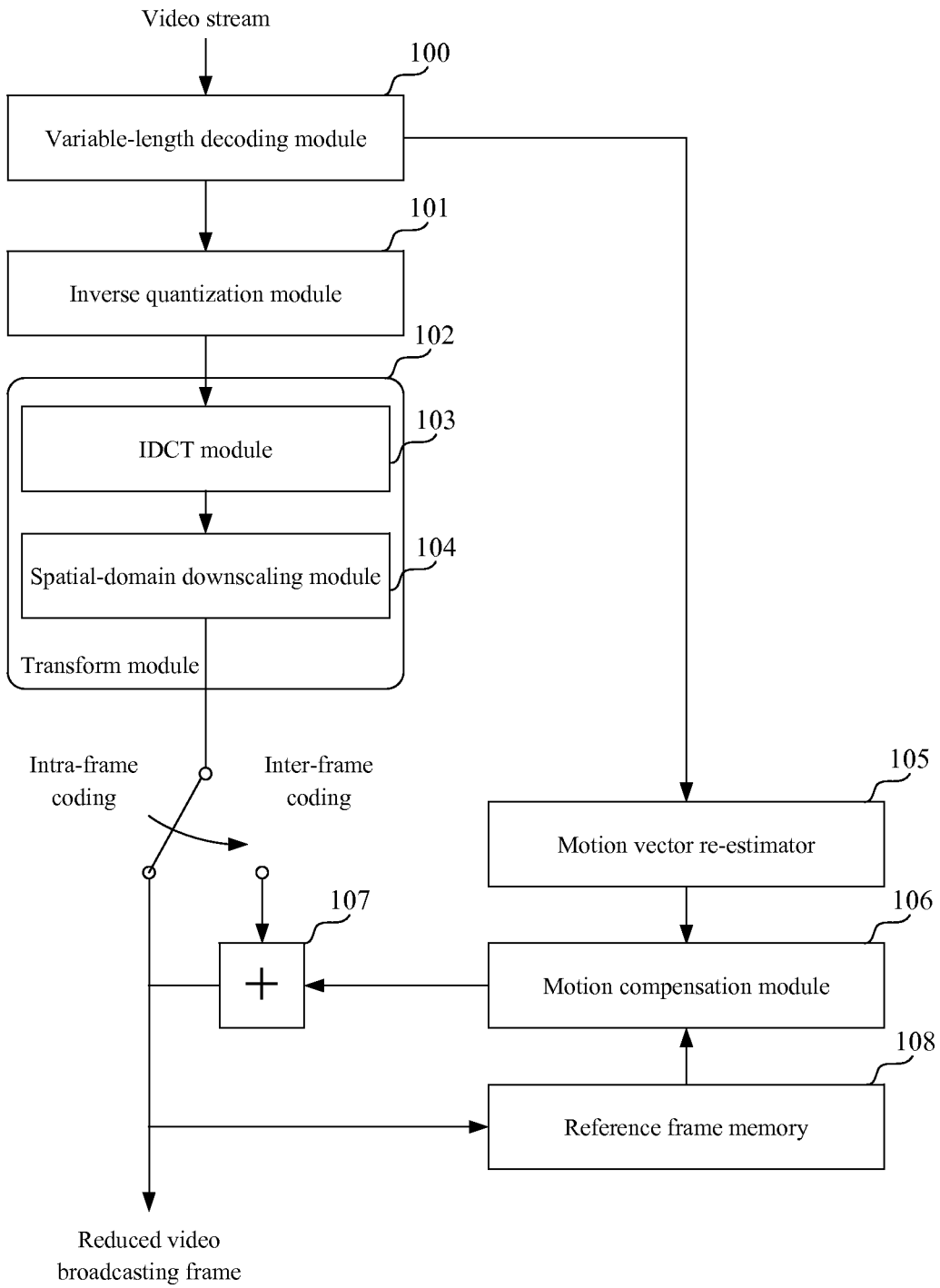
FIG. 1 is a block diagram of a first type of a conventional decoder according to the prior art.

Refer to FIG. 1 associated with a block diagram of a first type of a conventional decoder according to the prior art. As shown in FIG. 1, firstly, a video stream is received by a variable-length decoding module of a decoder; next, the variable-length decoding module 100 performs a variable length decoding for the video stream; then, the video stream after variable-length decoding is received by an inverse quantization module 101, that performs an inverse quantization process on the decoded video stream, hereby obtaining the frequency-domain coefficients. As shown in the drawing, a transform module 102 includes an IDCT module 103, and a spatial-domain downscaling module 104. Then, the frequency-domain coefficients are output to the IDCT module 103 of the transform module 102, hereby obtaining the spatial-domain data; then, spatial-domain downscaling module 104 is used to perform downscaling for the spatial-domain data, thus obtaining the downscaled spatial-domain data.

Figure 2:
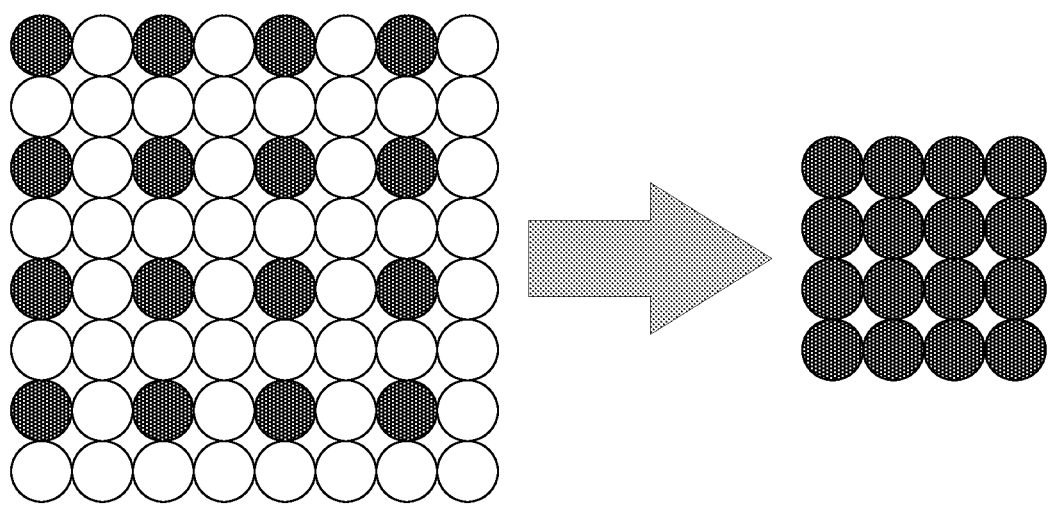
FIG. 2 is a schematic diagram showing the implementation of sub-sampling according to the present invention.

In FIG. 1, spatial-domain downscaling module 104 performs the process of frame-size reduction before the spatial-domain data are output from the transform module 102. Restated, the spatial-domain downscaling module 104 performs sub-sampling on the spatial-domain data after IDCT. Wherein, the manners of downscaling can be classified as regular interval sub-sampling, non-regular interval sub-sampling, and various other types of sub-samplings. Herein, a frame-size reduction using a regular interval sub-sampling is taken as an example for explanation. Before sub-sampling, filtering or interpolation can be conducted for the spatial-domain data, or not any pre-processing is performed, and then a regular interval sub-sampling is executed as shown in an embodiment of the present invention in FIG. 2. Wherein, the 64 points shown in the drawing represent 64 adjacent data of an 8×8 block in a spatial domain where the solid points denote the downscaled points, and the white points are the data to be eliminated. After sub-sampling, only 16 data are preserved to be output.

Moreover, it has to be determined that, the downscaled spatial-domain data originate from an intra-frame decoding or inter-frame decoding. In case that the downscaled spatial-domain data are decoded by an intra-frame technique, then these data are outputted for displaying directly and stored in a reference frame memory 108.

On the other hand, in case that the downscaled spatial-domain data are decoded by an inter-frame technique, then a motion vector re-estimator 105 computes a motion vector of a reference frame. Wherein, motion vector re-estimator 105 receives the motion vector information from the variable-length decoding module 100. As such, motion vector re-estimator 105 reduces the movement indicated by a motion vector based on the reduction ratio of a frame size, and then delivers the re-estimated motion vector to a motion compensation module 106 to proceed with motion compensation. The motion compensation module 106 will then utilize the motion vector to find out corresponding data in the reference frame memory 108 and execute a motion compensation. Subsequently, the output of the motion compensation module 106 and the output of the transform module 102 are added in an adder 107 to form the complete data, and then such complete data are outputted. These complete data can be displayed directly, and be stored in the reference frame memory 108.

The process of the spatial-domain downscaling module 104 is realized through matrix operations, which is operated according to equation (1) and is illustrated as follows:

$$X'_{N \times N} = L_{N \times M} \cdot X_{M \times M} \cdot L_{N \times M}^T \quad (1)$$

wherein, in equation (1), an equal reduction ratio of a frame length and width is taken as an example. Herein, the reduction ratios of the length and width in a frame are both N/M, where M is the length and width of a block in an original frame and N is the length and width of a block in a downscaled frame. The $X_{M \times M}$ and $X'_{N \times N}$ in equation (1) are the data transformed by an IDCT module 103 and conducted by a spatial-domain downscaling module 104, respectively. $L_{N \times M}$ and $L_{N \times M}^T$ are the transform matrices utilized in the spatial-domain downscaling module 104 where $L_{N \times M}$ and $L_{N \times M}^T$ are transpose matrices to each other.

Figure 3:
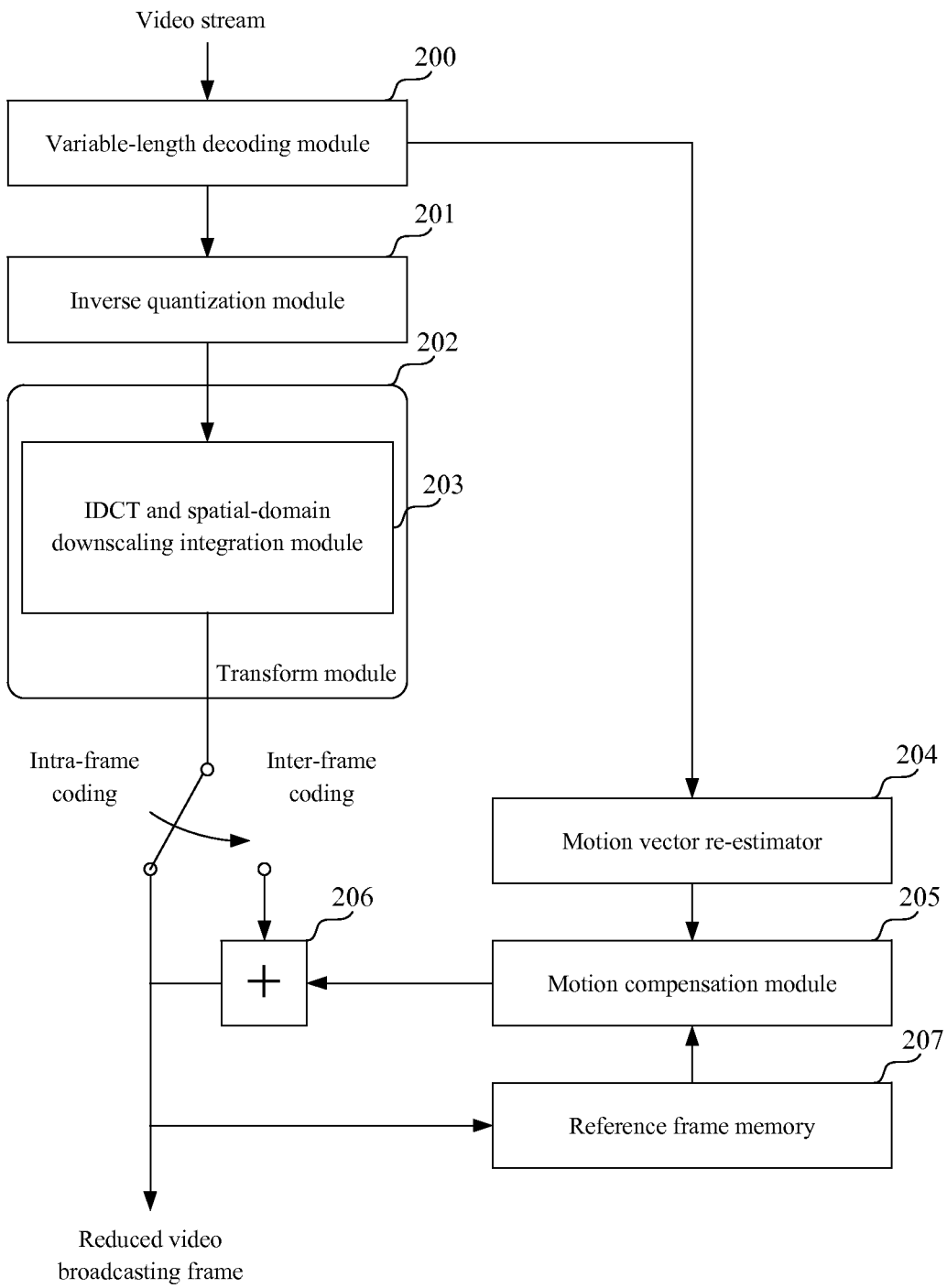
FIG. 3 is a block diagram of a second type of a conventional decoder according to the prior art.

Since the operations of the IDCT module 103 and spatial-domain downscaling module 104 can be realized through matrices, in this respect, refer to reference document 10 (Wenwu Zhu, Kyeong Ho Yang and E A. Faryar, "A fast and memory efficient algorithm for down-conversion of an HDTV bitstream to an SDTV signal," IEEE Transactions on Consumer Electronics, vol. 45, no. 1, pp. 57-61, February 1999) for one way of implementation. Wherein, the related processes of the above-mentioned two modules are integrated into and replaced with an integration matrix operation process, so as to reduce the number of data required to be processed by an IDCT. As shown in FIG. 3, firstly, a video stream is received by a variable-length-decoding module of a decoder; next, the variable-length decoding module 200 performs a variable-length decoding process for the video stream; then, the video stream after variable-length decoding is received by an inverse quantization module 201 and goes through an inverse quantization process, hereby obtaining frequency-domain coefficients. As shown in the drawing, a transform module 202 includes an IDCT and spatial-domain downscaling integration module 203; the frequency-domain coefficients are then output to the IDCT and spatial-domain downscaling integration module 203, hereby obtaining directly the inverse-transformed and downscaled spatial-domain data.

Moreover, it has to be determined that, the downscaled spatial-domain data originate from an intra-frame decoding or an inter-frame decoding. In case that the downscaled spatial-domain data are originally coded by an intra-frame technique, then the downscaled spatial-domain data can be displayed directly and be stored in a reference frame memory 207.

On the other hand, in case that the downscaled spatial-domain data are originally coded by an inter-frame technique, then a motion vector re-estimator 204 computes a motion vector of a reference frame. Wherein, motion vector re-estimator 204 receives the motion vector information from the variable-length decoding module 200. As such, motion vector re-estimator 204 reduces the movement indicated by the motion vector based on the reduction ratio of a frame size, and then the re-estimated motion vector is delivered to a motion compensation module 205 to proceed with a motion compensation. The motion compensation module 205 will then utilize the motion vector to find out corresponding data from a reference frame memory 207 and execute the motion compensation. Subsequently, the output of the motion compensation module 205 and the output of the transform module 202 are added in an adder 206 to build the complete result, and then such a complete result is output. This complete result can be displayed directly and be stored in the reference frame memory 207.

The transform process performed in an IDCT and spatial-domain downscaling integration module 203 is an integration of two processes: an IDCT process and a spatial-domain downscaling process. Wherein, the spatial-domain downscaling process can be conducted according to equation (1), while the IDCT process can be accomplished by equation (2) as shown as follows:

$$X_{M \times M} = D_{M \times M}^T \cdot Y_{M \times M} \cdot D_{M \times M} \quad (2)$$

$D_{M \times M}^T$ and $D_{M \times M}$ in equation (2) are the transform matrices utilized in an IDCT. $Y_{M \times M}$ and $X_{M \times M}$ are de-quantized frequency-domain coefficients and spatial-domain data, respectively. On substituting the equation (2) of an IDCT into equation (1), hereby the following equation (3) is obtained:

$$X'_{N \times N} = L_{N \times M} \cdot (D_{m \times M}^T \cdot Y_{M \times M} \cdot D_{M \times M}) \cdot L_{N \times M}^T \quad (3)$$

Since the dimensions of their matrices utilized in the operations are equal, a spatial-domain downscaling matrix can be incorporated into an IDCT matrix in obtaining an integrated matrix as expressed in the following equation (4):

$$X'_{N \times N} = H_{N \times M} \cdot T_{M \times M} \cdot K_{M \times N} \quad (4)$$

where $H_{N \times M}$ and $K_{N \times M}$ are equal to $L_{N \times M} \cdot D_{M \times M}^T$ and $D_{M \times M} \cdot L_{N \times M}^T$, respectively. Thus, the resulting matrix $X'_{N \times N}$ obtained through integrating the transform processes represents the downscaled spatial-domain data. In the above descriptions, equation (4) illustrates an integrated process relating to the IDCT and spatial-domain downscaling integration module 203.

In FIG. 3, the second type of a conventional decoder is described. Compared with the first type of a conventional decoder, the second type of a conventional decoder is able to reduce quite a lot of computation amount. However, after integrating the downscaling with an inverse transform, the computational complexity is still rather large. Therefore, the present invention proposes an integrated inverse transform and downscaling method, such that the computation amount of which is lower than those of the above-mentioned two conventional decoders. Wherein, the reduction ratio of a frame size and the characteristics of energy concentrating on low-frequency coefficients are utilized, such that the operation process represented by equation (4) can be simplified as shown in equation (5) as follows:

$$X'_{N_1 \times N_2} = H_{N_1 \times N_1} \cdot Y_{N_1 \times N_2} \cdot K_{N_2 \times N_2} \quad (5)$$

In the original operation processes before integration, the transform is performed on the entire frequency-domain coefficients $Y_{M \times M}$; however, in the simplified operation process after integration, the transform is only conducted on the low-frequency coefficients $Y_{N_1 \times N_2}$ located at the upper left side of a block. Since the number of frequency-domain coefficients to be processed is reduced, the transform matrix can also be simplified. Thus the transform matrices $H_{N_1 \times M \text{ and } KM \times N_2}$ in equation (4) can be simplified into $H_{N_1 \times N_1}$ and $K_{N_2 \times N_2}$, respectively. $H_{N_1 \times N_1}$ denotes the left portion of $H_{N_1 \times M}$, and $K_{N_2 \times N_2}$ represents the upper portion of matrix $K_{M \times N_2}$. As such, in this method, a frame-size reduction is only executed for low-frequency coefficients, though by doing so, it can further reduce the computation amount required, yet since when performing a reduction transform, the frequency-domain coefficients are not entirely maintained, hereby resulting in the consequence that part of high frequency information in a block is missing from the reduced and transformed spatial-domain data. To this shortcoming, the present invention proposes a compensation scheme of frequency-domain coefficients, such that the spatial-domain data obtained by a simplified process can keep the entire block information. As such, the simplified process having low computational complexity can be adopted to realize the abovementioned transform and downscaling.

In the simplified process, transforms are performed only for low-frequency coefficients, and thereby high-frequency information is lost. As such, in the present invention, to this simplified process, a frequency-domain compensation is conducted, wherein, high-frequency information is added into the low-frequency coefficients to be processed by the simplified process, such that the transformed spatial-domain data can contain high-frequency information. In adding high-frequency information into low-frequency coefficients, the conversion coefficients (namely, the coefficients in $H_{N_1 \times M}$ and $K_{M \times N_2}$) that are used to multiply the frequency coefficients in the original process must be considered. Therefore, the high-frequency coefficients must be multiplied by specific coefficients, then they can be added into the low frequency coefficients, and thus the correct high-frequency information can be preserved when a simplified process is employed. Supposing that the distribution of frequency-domain coefficients is as described in equation (6) as follows:

$$Y_{M \times M} = \begin{bmatrix} y_{(0,0)} & y_{(0,1)} & \cdots & y_{(0,N_2-2)} & y_{(0,N_2-1)} & y_{(0,N_2)} & 0 & 0 & \cdots & 0 \\ y_{(1,0)} & y_{(1,1)} & \cdots & y_{(1,N_2-2)} & y_{(1,N_2-1)} & 0 & 0 & 0 & \cdots & 0 \\ y_{(2,0)} & y_{(2,1)} & \cdots & y_{(2,N_2-2)} & y_{(2,N_2-1)} & 0 & 0 & 0 & \cdots & 0 \\ \vdots & \vdots & \vdots & \vdots & \vdots & \vdots & \vdots & \vdots & & \vdots \\ y_{(N_1-2,0)} & y_{(N_1-2,1)} & \cdots & y_{(N_1-2,N_2-2)} & y_{(N_1-2,N_2-1)} & 0 & 0 & 0 & \cdots & 0 \\ y_{(N_1-1,0)} & y_{(N_1-1,1)} & \cdots & y_{(N_1-1,N_2-2)} & y_{(N_1-1,N_2-1)} & 0 & 0 & 0 & \cdots & 0 \\ 0 & 0 & \cdots & 0 & 0 & 0 & 0 & 0 & \cdots & 0 \\ 0 & 0 & \cdots & 0 & 0 & 0 & 0 & 0 & \cdots & 0 \\ \vdots & \vdots & & \vdots & \vdots & \vdots & \vdots & \vdots & & \vdots \\ 0 & 0 & \cdots & 0 & 0 & 0 & 0 & 0 & \cdots & 0 \end{bmatrix} \quad (6)$$

wherein, the reduction ratios of frame length and width are assumed to be $N_1/M$ and $N_2/M$, respectively. When equation (5) is used in implementing the simplified process, the transform is only performed for $N_1 \times N_2$ low-frequency coefficients at the upper left corner of a matrix. Therefore, after transform, the information of high-frequency coefficient $y_{(0,N_2)}$ is lacking, thus resulting in degradation of picture quality. Hence, the present invention proposes a frequency-domain compensation scheme, wherein, the information of the high-frequency coefficients is added to the low-frequency coefficients. Restated, $Y_{N_1 \times N_2}$ is transformed into $\overline{Y}_{N_1 \times N_2}$ through a frequency-domain compensation scheme, and then the simplified transform is executed as shown in equation (7):

$$\overline{X}_{N_1 \times N_2} = H_{N_1 \times N_1} \cdot \overline{Y}_{N_1 \times N_2} \cdot K_{N_2 \times N_2} \quad (7)$$

$\overline{X}_{N_1 \times N_2}$ denotes the spatial-domain data obtained after the transform. Supposing that $Y_{M \times M}$ is represented by equation (6), and herein $y_{(0,N_2)}$ is multiplied by a specific matrix $r_{(u,v)}$, then the multiplied results are added into $\overline{Y}_{N_1 \times N_2}$ through utilizing equation (8) as follows:

$$\overline{Y}_{N_1 \times N_2} = Y_{N_1 \times N_2} + R_{N_1 \times N_2} = \quad (8)$$

$$\begin{bmatrix} y_{(0,0)} & y_{(0,1)} & \cdots & y_{(0,N_2-2)} & y_{(0,N_2-1)} \\ y_{(0,0)} & y_{(1,1)} & \cdots & y_{(1,N_2-2)} & y_{(1,N_2-1)} \\ \cdots & \cdots & \cdots & \cdots & \cdots \\ y_{(N_1-2,0)} & y_{(N_1-2,1)} & \cdots & y_{(N_1-2,N_2-2)} & y_{(N_1-2,N_2-1)} \\ y_{(N_1-1,0)} & y_{(N_1-1,1)} & \cdots & y_{(N_1-1,N_2-2)} & y_{(N_1-1,N_2-1)} \end{bmatrix} +$$

$$\begin{bmatrix} r_{(0,0)} \cdot y_{(0,N_2)} & r_{(0,1)} \cdot y_{(0,N_2)} & \cdots & r_{(0,N_2-2)} \cdot y_{(0,N_2)} & r_{(0,N_2-1)} \cdot y_{(0,N_2)} \\ r_{(1,0)} \cdot y_{(0,N_2)} & r_{(1,1)} \cdot y_{(0,N_2)} & \cdots & r_{(1,N_2-2)} \cdot y_{(0,N_2)} & r_{(1,N_2-1)} \cdot y_{(0,N_2)} \\ \cdots & \cdots & \cdots & \cdots & \cdots \\ r_{(N_1-2,0)} \cdot y_{(0,N_2)} & r_{(N_1-2,1)} \cdot y_{(0,N_2)} & \cdots & r_{(N_1-2,N_2-2)} \cdot y_{(0,N_2)} & r_{(N_1-2,N_2-1)} \cdot y_{(0,N_2)} \\ r_{(N_1-1,0)} \cdot y_{(0,N_2)} & r_{(N_1-1,1)} \cdot y_{(0,N_2)} & \cdots & r_{(N_1-1,N_2-2)} \cdot y_{(0,N_2)} & r_{(N_1-1,N_2-1)} \cdot y_{(0,N_2)} \end{bmatrix}.$$

The result from equation (8) is $\overline{Y}_{N_1 \times N_2}$ and then is employed in equation (7). The result $\overline{X}_{N_1 \times N_2}$ is compared with the result $X'_{N_1 \times N_2}$ obtained through performing a complete process as described in equation (4). In case it is desired that the results from the abovementioned compensation scheme can be equal to those from a complete process, therefore, assuming that $X'_{N_1 \times N_2} = \overline{X}_{N_1 \times N_2}$, in other words, for the two matrices, each of the spatial-domain data is equal to each other. In order to achieve this purpose, the frequency domain coefficient $y_{(0,N_2)}$ must be taken into consideration of the transform process. Herein, the difference between taking the coefficient $y_{(0,N_2)}$ into consideration of a frequency-domain to a spatial-domain transform and not taking the coefficient $y_{(0,N_2)}$ into consideration of a frequency-domain to a spatial-domain transform is utilized to further deduce in reverse the compensation values required by the coefficient $y_{(0,N_2)}$ relative to $\overline{Y}_{N_1 \times N_2}$. Utilizing the above-mentioned derivations, the following $N_1 \times N_2$ equations need to be satisfied:

$$g_{(0,0)}^{(0,0)} \cdot r_{(0,0)} \cdot y_{(0,N_2)} + g_{(0,1)}^{(0,0)} \cdot r_{(0,1)} \cdot y_{(0,N_2)} + \cdots \quad (9)$$

$$g_{(0,0)}^{(0,1)} \cdot r_{(0,0)} \cdot y_{(0,N_2)} + g_{(0,1)}^{(0,1)} \cdot r_{(0,1)} \cdot y_{(0,N_2)} + \cdots$$

$$+ g_{(N_1-1,N_2-2)}^{(0,0)} \cdot r_{(N_1-1,N_2-2)} \cdot y_{(0,N_2)} +$$

$$g_{(N_1-1,N_2-1)}^{(0,0)} \cdot r_{(N_1-1,N_2-1)} \cdot y_{(0,N_2)} = g_{(0,N_2)}^{(0,0)} \cdot y_{(0,N_2)}$$

$$+ g_{(N_1-1,N_2-2)}^{(0,1)} \cdot r_{(N_1-1,N_2-2)} \cdot y_{(0,N_2)} + g_{(N_1-1,N_2-1)}^{(0,1)} \cdot r_{(N_1-1,N_2-1)} \cdot y_{(0,N_2)} =$$

$$g_{(0,N_2)}^{(0,1)} \cdot y_{(0,N_2)}$$

$$\vdots$$

$$g_{(0,0)}^{(N_1-1,N_2-2)} \cdot r_{(0,0)} \cdot y_{(0,N_2)} + g_{(0,1)}^{(N_1-1,N_2-2)} \cdot r_{(0,1)} \cdot y_{(0,N_2)} + \cdots$$

$$g_{(0,0)}^{(N_1-1,N_2-1)} \cdot r_{(0,0)} \cdot y_{(0,N_2)} + g_{(0,1)}^{(N_1-1,N_2-1)} \cdot r_{(0,1)} \cdot y_{(0,N_2)} + \cdots$$

$$+ g_{(N_1-1,N_2-2)}^{(N_1-1,N_2-2)} \cdot r_{(N_1-1,N_2-2)} \cdot y_{(0,N_2)} +$$

$$g_{(N_1-1,N_2-1)}^{(N_1-1,N_2-2)} \cdot r_{(N_1-1,N_2-1)} \cdot y_{(0,N_2)} = g_{(0,N_2)}^{(N_1-1,N_2-2)} \cdot y_{(0,N_2)}$$

$$+ g_{(N_1-1,N_2-2)}^{(N_1-1,N_2-1)} \cdot r_{(N_1-1,N_2-2)} \cdot y_{(0,N_2)} +$$

$$g_{(N_1-1,N_2-1)}^{(N_1-1,N_2-1)} \cdot r_{(N_1-1,N_2-1)} \cdot y_{(0,N_2)} = g_{(0,N_2)}^{(N_1-1,N_2-1)} \cdot y_{(0,N_2)}.$$

On the right side of the equal mark of equation (9) are spatial-domain data generated by a complete process associated with $y_{(0,N_2)}$, and on the left side of the equal mark are spatial-domain data generated by the simplified process with the frequency compensation scheme where $g_{(u,v)}^{(x,y)}$ is a coefficient (namely, the coefficient in $H_{N_1 \times M}$ and $K_{M \times N_2}$, $g_{(u,v)}^{(x,y)} = h_{(x,u)} \times k_{(v,y)}$) that each frequency-domain coefficient must be multiplied with while performing the transform. Since $h_{(u,v)}^{(x,y)}$ and $y_{(0,N_2)}$ are already known, therefore, the unknown variable $r_{(u,v)}$ can be obtained through solving the $N_1 \times N_2$ equations mentioned above, and then the $r_{(u,v)}$ thus obtained is adopted in equation (8) to obtain $\overline{Y}_{N_1 \times N_2}$. Furthermore, substitute $\overline{Y}_{N_1 \times N_2}$ into equation (7) of the transform to obtain $\overline{X}_{N_1 \times N_2}$, such that $X'_{N_1 \times N_2} = \overline{X}_{N_1 \times N_2}$. The compensation of other high-frequency coefficients can be conducted at the same way as it is done for $y_{(0,N_2)}$ just mentioned, thus figuring out the various $r_{(u,v)}$ required while making compensations. In particular, this $r_{(u,v)}$ is a fixed value for each of the high-frequency coefficients, and therefore it can be stored in advance in a table in facilitating the subsequent transforms. In other words, the matrix in equation (4) can be decomposed into the following equation (10) based on the integrated process as described in equation (4), and taking into consideration of unequal reduction ratios of the frame length and width:

$$X'_{N_1 \times N_2} = H_{N_1 \times M} \cdot Y_{M \times M} \cdot K_{M \times N_2} \quad (10)$$

$$= [H_{N_1 \times N_1} \quad H_{N_1 \times (M-N_1)}] \cdot$$

$$\begin{bmatrix} Y_{N_1 \times N_2} & Y_{N_1 \times (M-N_2)} \\ Y_{(M-N_1) \times N_2} & Y_{(M-N_1) \times (M-N_2)} \end{bmatrix} \cdot \begin{bmatrix} K_{N_2 \times N_2} \\ K_{(M-N_2) \times N_2} \end{bmatrix}$$

$$= [H_1 \quad H_2] \cdot \begin{bmatrix} Y_1 & Y_2 \\ Y_3 & Y_4 \end{bmatrix} \cdot \begin{bmatrix} K_1 \\ K_2 \end{bmatrix}$$

where dimensions of $H_1$, $H_2$, $Y_1$, $Y_2$, $Y_3$, $Y_4$, $K_1$ and $K_2$ are $N_1 \times N_1$, $N_1 \times (M-N_1)$, $N_1 \times N_2$, $N_1 \times (M-N_2)$, $(M-N_1) \times N_2$, $(M-N_1) \times (M-N_2)$, $N_2 \times N_2$ and $(M-N_2) \times N_2$, respectively. In addition, equation (10) can further be derived as follows:

$$X'_{N_1 \times N_2} = [H_1 \quad H_2] \cdot \begin{bmatrix} Y_1 & Y_2 \\ Y_3 & Y_4 \end{bmatrix} \cdot \begin{bmatrix} K_1 \\ K_2 \end{bmatrix} \quad (11)$$

$$= [H_1 \times Y_1 + H_2 \times Y_3 \quad H_1 \times Y_2 + H_2 \times Y_4] \cdot \begin{bmatrix} K_1 \\ K_2 \end{bmatrix}$$

$$= H_1 \times Y_1 \times K_1 + H_2 \times Y_3 \times K_1 +$$

$$H_1 \times Y_2 \times K_2 + H_2 \times Y_4 \times K_2$$

$$= H_1 \times$$

$$\begin{pmatrix} Y_1 + H_1^{-1} \times H_2 \times Y_3 + Y_2 \times K_2 \times K_1^{-1} + \\ H_1^{-1} \times H_2 \times Y_4 \times K_2 \times K_1^{-1} \end{pmatrix} \times K_1$$

$$= H_1 \times (Y_1 + R_{N_1 \times N_2}) \times K_1$$

where $H_1^{-1} \times H_2 \times Y_3 + Y_2 \times K_2 \times K_1^{-1} \times H_1^{-1} \times H_2 \times Y_4 \times K_2 \times K_1^{-1}$ represents the compensation matrix $R_{N_1 \times N_2}$, wherein $H_1^{-1}$ is the inversed first portion of the combined matrix from the down-scale matrix and the transposed inverse transform matrix, $H_2$ is the second portion of the combined matrix from the down-scale matrix and the transposed inverse transform matrix, $Y_3$ is the left-bottom portion of the frequency-domain coefficient matrix, $Y_2$ is the right-top portion of the frequency-domain coefficient matrix, $Y_4$ is the right-bottom portion of the frequency-domain coefficient matrix, $K_2$ is the second portion of the combined matrix from the inverse transform matrix and the transposed down-scale matrix, $K_1^{-1}$ is the inversed first portion of the combined matrix from the inverse transform matrix and the transposed down-scale matrix. Moreover, each value in matrices $Y_2$, $Y_3$, and $Y_4$ can be decomposed, in order to find out the relations between each value and its corresponding compensation coefficient, namely, the relations between equation (9) and the coefficients $r_{(u,v)}$. Finally, in performing the compensation computation of high-frequency coefficients, the End-Of-Block (EOB) points are utilized in proceeding with compensation computation for the non-zero coefficients before the EOB point. Therefore, the overall computational complexity of frequency-domain downscaling can be varied depending on the contents of video streams. However, on the whole, the total computational complexity of the method proposed by the present invention is still less than that of the conventional spatial-domain downscaling method.

In the present invention, the inverse transform and sub-sampling selects a suitable dimension of a matrix as based on the requirement of downscaling, and the matrix dimension is smaller than that of the original matrix associated with a block. Then, integrate the matrix coefficients of an inverse transform with the matrix coefficients of sub-sampling under a specific small dimension in performing inverse transform and downscaling, in cooperation with the compensated frequency-domain coefficients. In other words, input signals are separated into high-frequency and low-frequency coefficients as based on the manner of data sub-sampling, in determining the dimension of an inverse transform matrix. The reduction ratios of the frame length and width can be utilized, such as the original frame size $L_1 \times W_1$, in reducing the frame size into $L_2 \times W_2$; and approximately reduce the dimension of an inverse transform matrix through utilizing the reduction ratios of $L_2/L_1$ and $W_2/W_1$, thus realizing the downscaling and determining the number of low-frequency coefficients.

Figure 4:
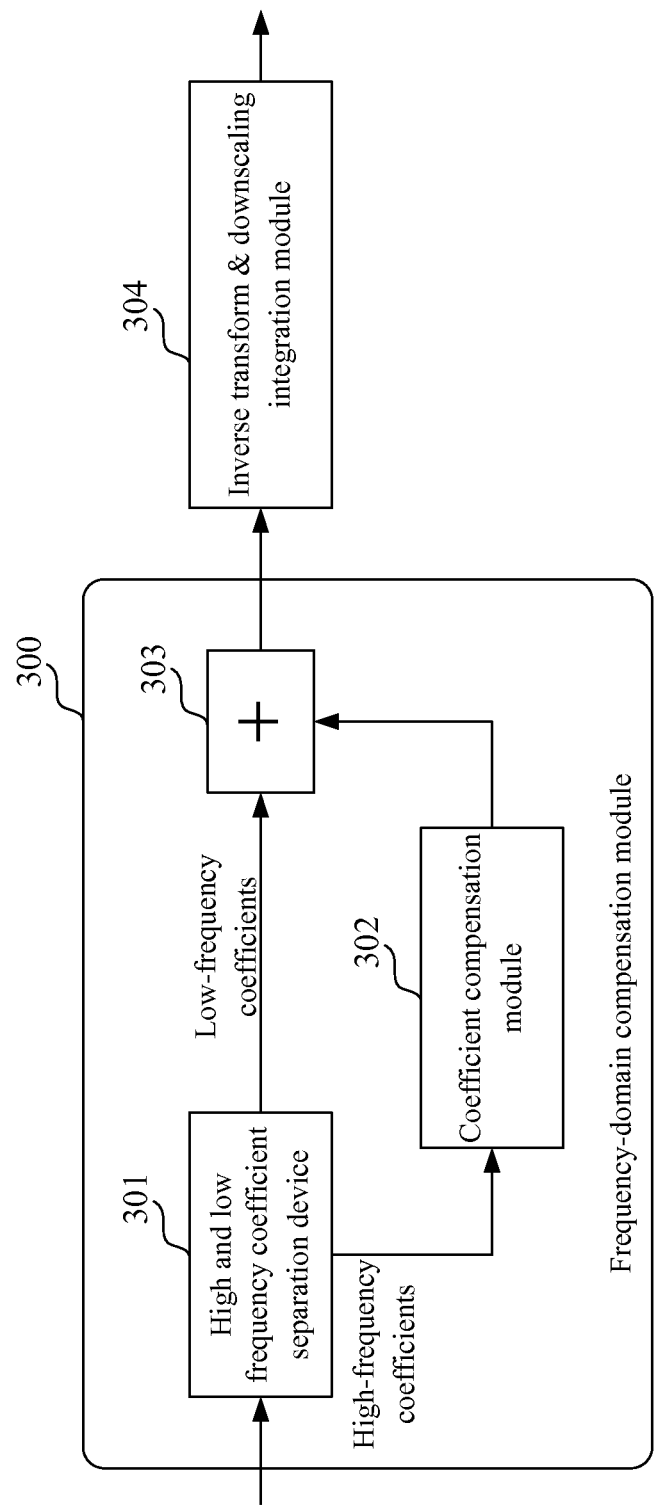
FIG. 4 is a schematic block diagram of a transform module according to the present invention.
Figure 5:
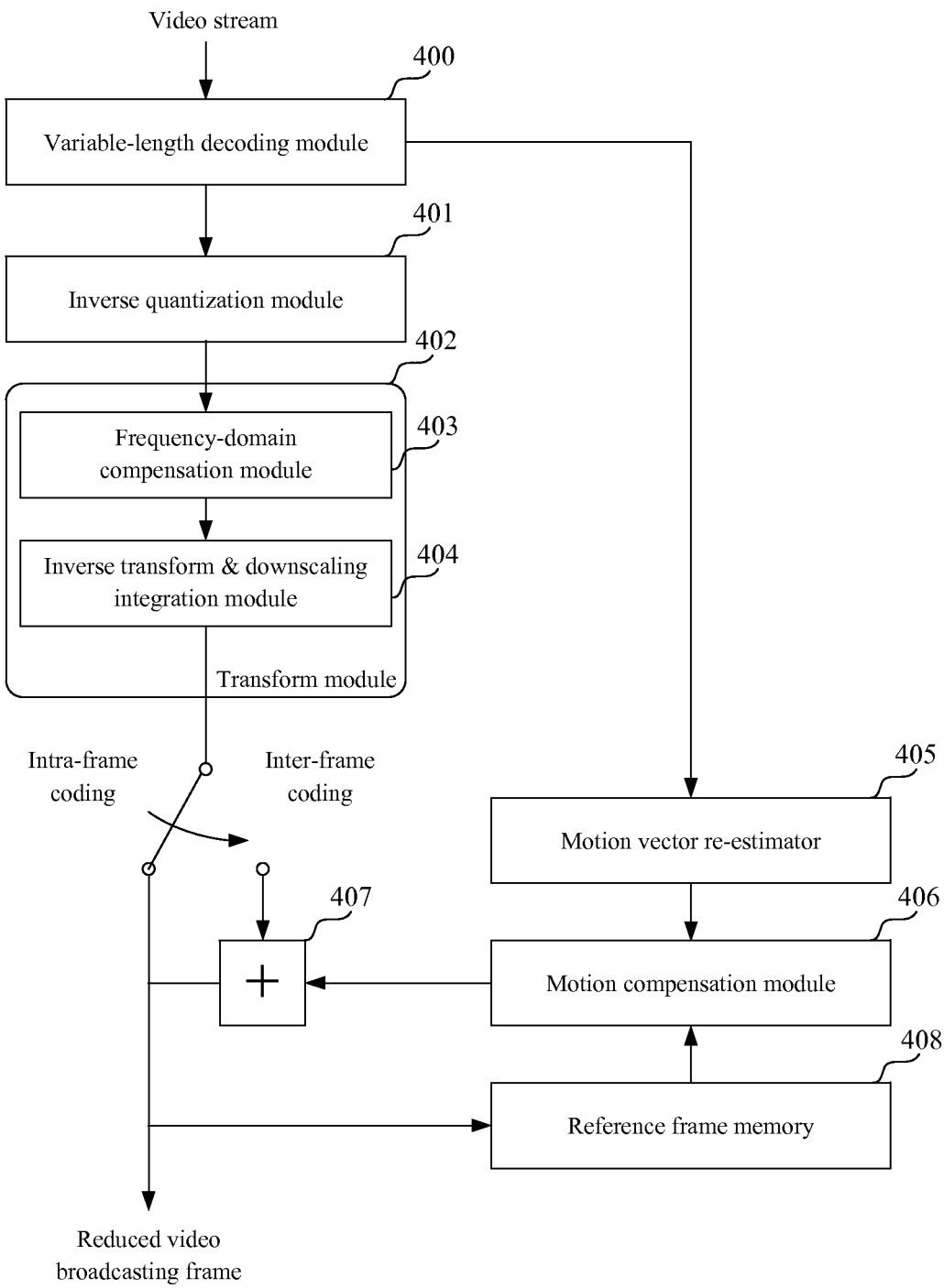
FIG. 5 is a block diagram of a video decoder utilized in realizing the method of present invention according to an embodiment of the present invention.

In the present invention, the inverse transform and sub-sampling processes are simplified and integrated, and the frequency-domain compensation concept and scheme are additionally provided and executed to eliminate the distortion as caused by the simplified process. The structure and the related process flow of the frequency-domain compensation of the present invention is as shown in FIG. 4, wherein, the frequency-domain coefficients are separated into two portions (high-frequency coefficients and low-frequency coefficients) through a high and low frequency coefficient separation device 301 of a frequency-domain compensation module 300 as based on a reduction ratio. Next, the non-zero high-frequency coefficients are compensated by a coefficient compensation module 302 in obtaining the compensation matrix $R_{N_1 \times N_2}$. Then, $R_{N_1 \times N_2}$ is added with the low-frequency coefficients $Y_{N_1 \times N_2}$ in an adder 303 to yield $\overline{Y}_{N_1 \times N_2}$. Subsequently, $\overline{Y}_{N_1 \times N_2}$ goes through an inverse transform and downscaling integration module 304 in obtaining $\overline{X}_{N_1 \times N_2}$. Then, refer to FIG. 5 for a diagram showing the application of the method proposed by the present invention into a video decoder according to an embodiment of the present invention, wherein, the structure and the related process of a transform module 402 is shown in FIG. 4. As shown in FIG. 5, firstly, a video stream is received by a variable-length decoding module of a decoder; next, a variable-length decoding module 400 performs variable-length decoding for the video stream; then, the video stream after variable-length decoding is received by an inverse quantization module 401, that performs an inverse quantization process on the video stream, hereby obtaining the frequency-domain coefficients. As shown in the drawing, a transform module 402 includes a frequency-domain compensation module 403 and an inverse transform and downscaling integration module 404. The frequency-domain coefficients are then output to a frequency-domain compensation module 403 of a transform module 402, hereby obtaining a $\overline{Y}_{N_1 \times N_2}$. Then, it is delivered to an inverse transform and downscaling integration module 404 and is transformed and downscaled in obtaining the spatial-domain data ($\overline{X}_{N_1 \times N_2}$).

Moreover, it has to be determined that, the downscaled spatial-domain data are originally coded by an intra-frame or an inter-frame coding technique. In case that the downscaled spatial-domain data come from an intra-frame coding, then the downscaled spatial-domain data can be displayed directly, and can be stored in a reference frame memory 408.

On the other hand, in case that the downscaled spatial-domain data originate from an inter-frame coding, then a motion vector re-estimator 405 computes a motion vector associated with a downscaled frame. Wherein, motion vector re-estimator 405 receives the motion vector information from a variable-length decoding module 400. As such, the motion vector re-estimator 405 re-estimates the motion vector based on the reduction ratio of a frame size, then delivers the re-estimated motion vector to a motion compensation module 406 to proceed with a motion compensation. The motion compensation module 406 will then utilize this motion vector to find out a corresponding block from a reference frame memory 408 and execute a motion compensation. Subsequently, the output of the motion compensation module 406 and the output of the transform module 402 are added in an adder 407 to form the complete data. This complete data can be displayed directly, and be stored in a reference frame memory 408.

As mentioned in reference document 10, its frequency-domain downscaling method is shown in FIG. 3, wherein the complete frequency-domain coefficients can be preserved. However, in a method proposed by the present invention, a complete frequency-domain coefficient can be preserved through a frequency-domain compensation scheme, besides, it can reduce significantly the computational complexity required for frequency-domain downscaling. In addition, as compared with U.S. Pat. No. 6,141,456 (reference document 11), the present invention is able to simplify a frequency-domain downscaling process to reach low computational complexity. That is a great improvement over reference document 11 in which large amount of high-frequency information is lost.

With regard to a specific size reduction, such as reduction from a size of 720×480 to a size of 352×288, a simplified method can be used to achieve the size reduction of the above-mentioned reduction ratio. In this way, the frame length and width are reduced through an unequal reduction ratio, such that the frame size is first reduced to close to 352×288, then boundary trimming is performed to achieve the results required. In a method proposed by the present invention, the unequal reduction ratios of the frame length and width can also be realized. Supposing that the reduction ratios of frame width and length are $N_2/M$ and $N_1/M$, respectively, a complete frequency-domain downscaling is achieved through equation (7). Before executing the simplified frequency-domain downscaling, defining the range of low-frequency coefficients as the $N_1 \times N_2$ in the upper left corner of a block $Y_{M \times M}$ as based on a reduction ratio, then execute a frequency-domain compensation for $(M \times M - N_1 \times N_2)$ high-frequency coefficients, and the $r_{(u,v)}$ required in executing coefficient compensation can be obtained from equation (9).

In order to apply the method of inverse transform and sub-sampling from a frequency domain to a spatial domain having low computational complexity of the present invention into a video codec, the following two embodiments are provided in explaining the method and application of (1) equal reduction ratio of the frame length and width and (2) unequal reduction ratios of the frame length and width:

(1) Equal reduction ratio of the frame length and width, assuming N=4 and M=8: the spatial-domain downscaling is performed through equation (12) as follows:

$$X'_{4\times 4} = L_{4\times 8} \cdot X_{8\times 8} \cdot L_{4\times 8} \quad (12)$$

wherein, the spatial-domain downscaling is assumed to be realized in a regular interval sub-sampling manner, and its reduction transform matrix $L_{4\times 8}$ is defined by equation (13) as follows:

$$L_{4\times 8} = \begin{bmatrix} 1 & 0 & 0 & 0 & 0 & 0 & 0 & 0 \\ 0 & 0 & 1 & 0 & 0 & 0 & 0 & 0 \\ 0 & 0 & 0 & 0 & 1 & 0 & 0 & 0 \\ 0 & 0 & 0 & 0 & 0 & 0 & 1 & 0 \end{bmatrix}. \quad (13)$$

The frequency-domain downscaling can be accomplished by equation (14), and its simplified matrix operation is derived in equation (15) as follows:

$$X'_{4\times 4} = H_{4\times 8} \cdot Y_{8\times 8} \cdot K_{8\times 4} \quad (14)$$

and $$X'_{4\times 4} = H_{4\times 4} \cdot Y_{4\times 4} \cdot K_{4\times 4} \quad (15)$$

$Y_{4\times 4}$ is the result obtained through preserving 16 coefficients in the upper left corner of the block $Y_{8\times 8}$. As such, the block $\overline{Y}_{4\times 4}$ can be obtained through executing coefficient compensation according to equation (8). Then, a simplified inverse transform and downscaling are conducted by utilizing the compensated coefficients $\overline{Y}_{4\times 4}$ according to equation (16), thus obtaining complete spatial-domain data $\overline{X}_{4\times 4}$.

$$\overline{X}_{4\times 4} = H_{4\times 4} \cdot \overline{Y}_{4\times 4} \cdot K_{4\times 4} \quad (16)$$

The table required in the frequency-domain compensation can be defined by finding each of the specific coefficients $r_{(u,v)}$ with that each of high-frequency coefficients must be multiplied by utilizing equations (8) and (9). Tables (2) and (3) list the comparisons of computational complexity and picture quality of methods, respectively, according to reference documents 10, 11 and the present invention where A and B represent addition and multiplication, respectively, and C denotes the condition determination of whether a high-frequency component is zero or not.

TABLE 2

Comparisons of computational complexity for a reduction ratio 4/8

| | Sequences | | |
|---|---|---|---|
| Methods | Foreman | Stefan | M&D |
| [10] | 384B + 384A | 384B + 384A | 384B + 384A |
| [11] | 128B + 128A | 128B + 128A | 128B + 128A |
| Proposed | 183B + 183A + 26C | 166B + 166A + 23C | 186B + 186A + 27C |

TABLE 3

Comparisons of picture quality for a reduction ratio 4/8

| Methods | Sequences | | |
|---|---|---|---|
| | Foreman PSNR(dB) | Stefan PSNR(dB) | M&D PSNR(dB) |
| [10] | 36.17 | 31.35 | 42.28 |
| [11] | 33.68 | 28.71 | 39.39 |
| Proposed | 36.22 | 31.36 | 42.14 |

From Tables (2) and (3), the method of inverse transform and sub-sampling having low computational complexity in the present invention is able to maintain good picture quality, and yet its computational complexity is less than the un-simplified frequency-domain downscaling methods. In the method proposed by the present invention, an EOB point is employed to further minimize the number of condition determinations of whether a high-frequency coefficient is zero or not. Therefore, the computational complexity is varied depending on contents of various video streams.

(2) Unequal reduction ratios of the frame length and width, assuming $N_1=4$, $N_2=5$, and $M=8$: The spatial-domain transform is realized through equation (17) as follows:

$$X'_{5\times 4}=L_{5\times 8}\cdot X_{8\times 8}\cdot R_{8\times 4} \quad (17)$$

wherein $L_{5\times 8}$ and $R_{8\times 4}$ are represented by equations (18) and (19), respectively:

$$L_{5\times 8}=\begin{bmatrix} 1 & 0 & 0 & 0 & 0 & 0 & 0 & 0 \\ 0 & 0.4 & 0.6 & 0 & 0 & 0 & 0 & 0 \\ 0 & 0 & 0 & 0.8 & 0.2 & 0 & 0 & 0 \\ 0 & 0 & 0 & 0 & 0.2 & 0.8 & 0 & 0 \\ 0 & 0 & 0 & 0 & 0 & 0 & 0.6 & 0.4 \end{bmatrix} \quad (18)$$

and $$R_{8\times 4}=\begin{bmatrix} 1 & 0 & 0 & 0 \\ 0 & 0 & 0 & 0 \\ 0 & 1 & 0 & 0 \\ 0 & 0 & 0 & 0 \\ 0 & 0 & 0 & 0 \\ 0 & 0 & 1 & 0 \\ 0 & 0 & 0 & 0 \\ 0 & 0 & 0 & 1 \\ 0 & 0 & 0 & 0 \end{bmatrix}. \quad (19)$$

The frequency-domain transform is performed by using equation (20), and its simplified transform equation is formulated by equation (21) as follows:

$$X'_{5\times 4}=H_{5\times 8}\cdot Y_{8\times 8}\cdot K_{8\times 4} \quad (20)$$

and $$X'_{5\times 4}=H_{5\times 5}\cdot Y_{5\times 4}\cdot K_{4\times 4} \quad (21)$$

$Y_{5\times 4}$ is the result of preserving 20 coefficients in the upper left corner of $Y_{8\times 8}$, then the frequency-domain compensation is conducted to obtain $\overline{Y}_{5\times 4}$, and its simplified transform equation is equation (22) as follows:

$$\overline{X}_{5\times 4}=H_{5\times 5}\cdot \overline{Y}_{5\times 4}\cdot K_{4\times 4} \quad (22)$$

The table required for realizing the coefficient compensations can be obtained as shown in equations (8) and (9). For the application of unequal reduction ratios of the frame length and width, the reduction of a frame size from 720×480 to 352×288 is taken as an example for explanation. Through the application of the method proposed by the present invention in implementing inverse transform and downscaling under reduction ratios 5/8 and 4/8 at the frame length and width, respectively, hereby obtaining spatial-domain data with a frame size of 360×300, then trimming the boundary of the frame, thus obtaining spatial-domain data with a frame size 352×288. Table (4) lists a comparison of picture quality for a reduction of a frame size from 720×480 to 360×300 with and without the coefficient compensation mechanism (coeff. comp. mech).

TABLE 4

Comparison of picture quality for a frame size from 720 × 480 to 360 × 300.

| Proposed method | Quality PSNR(dB) |
|---|---|
| Without coeff. comp. mech | 37.09 |
| With coeff. comp. mech | 38.40 |

In the present invention, a method of inverse transform and sub-sampling used for a video codec having low computational complexity is proposed. Its objective is to reach the inverse transform and sub-sampling from a frequency domain to a spatial domain at a low computation cost. Particularly, it can be utilized in a video or image codec for inverse transform and downscaling from a frequency domain to a spatial domain, hereby reducing the computational complexity and increasing decoding speed. The method of the present invention can be applied to a frame length and width with equal and unequal reduction ratios.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A method of inverse transform and sub-sampling having low computational complexity, comprising:
   separating input signals into high-frequency signals and low-frequency signals;
   expressing said high-frequency signals as a high frequency matrix in spatial domain, and expressing said low-frequency signals as a low frequency matrix in spatial domain;
   performing compensation computations according to $H_1^{-1}\times H_2\times Y_3+Y_2\times K_2\times K_1^{-1}\times H_1^{-1}\times H_2\times Y_4\times K_2\times K_1^{-1}$, wherein
   $H_1^{-1}$ is the inversed first portion of the combined matrix from the down-scale matrix and the transposed inverse transform matrix,
   $H_2$ is the second portion of the combined matrix from the down-scale matrix and the transposed inverse transform matrix,
   $Y_3$ is the left-bottom portion of the frequency-domain coefficient matrix,
   $Y_2$ is the right-top portion of the frequency-domain coefficient matrix,
   $Y_4$ is the right-bottom portion of the frequency-domain coefficient matrix, $K_2$ is the second portion of the combined matrix from the inverse transform matrix and the transposed down-scale matrix, $K_1^{-1}$ is the inversed first portion of the combined matrix from the inverse transform matrix and the transposed down-scale matrix;

obtaining compensation values for non-zero high-frequency signals;

adding separated low-frequency signals with said compensation values;

selecting a dimension of an inverse transform matrix depending on actual sub-sampling requirements for said inverse transform and said sub-sampling;

said dimension of said inverse transform matrix being less than that of an original inverse transform matrix;

integrating a matrix of said inverse transform with said matrix of said sub-sampling in cooperation with compensated frequency-domain coefficients, in proceeding with said inverse transform and said sub-sampling of said matrix;

separating said input signals into said high-frequency signals and said low-frequency signals being based on ways of sub-sampling;

determining the dimension of the inverse transform matrix according to reduction ratios of a frame length and width;

utilizing an original frame size $L_1 \times W_1$ in reducing a frame size into $L_2 \times W_2$;

reducing said dimension of said inverse transform matrix through reduction ratios of $L_2/L_1$ and $W_2/W_1$;

realizing a frame-size reduction transform, and determining a plurality of said low-frequency signals; and performing an inverse transform and a sub-sampling for a result of additions.

2. The method of inverse transform and sub-sampling having low computational complexity as claimed in claim 1, wherein performing said compensation computations and obtaining said compensation values for said non-zero high-frequency signals, said compensation computations are used to produce said compensation values by multiplying items of a table with said non-zero high-frequency signals.

3. The method of inverse transform and sub-sampling having low computational complexity as claimed in claim 2, wherein said compensation computations are performed by a compensation module, and said compensation module is provided with a built-in table, or said compensation module produces said table through computations.

4. The method of inverse transform and sub-sampling having low computational complexity as claimed in claim 1, wherein in performing said compensation computations for said non-zero high-frequency signals, an end-of-block point is used, so as to perform said compensation computations for non-zero high-frequency coefficients before said end-of-block point, hereby reducing a plurality of determinations of said non-zero high-frequency signals.

5. The method of inverse transform and sub-sampling having low computational complexity as claimed in claim 1, wherein said inverse transform is one of following: an inverse discrete cosine transform, an inverse discrete sine transform, an inverse discrete Fourier transform, an inverse discrete wavelet transform, and various other inverse transforms.

6. The method of inverse transform and sub-sampling having low computational complexity as claimed in claim 1, wherein said sub-sampling includes filtering of data or not performing any pre-processing, and said sub-sampling is classified into: a regular interval sub-sampling, a non-regular interval sub-sampling, and various other sub-samplings.

* * * * *